United States Patent [19]

Wahl

[11] 4,056,155

[45] Nov. 1, 1977

[54] PORTABLE TRAILER TONGUE WEIGHT SCALE

[76] Inventor: Martin H. Wahl, R.D. 2, Box 53, Evans City, Pa. 16033

[21] Appl. No.: 662,712

[22] Filed: Mar. 1, 1976

[51] Int. Cl.$^2$ .............................................. G01G 3/02
[52] U.S. Cl. .................................... 177/145; 177/233
[58] Field of Search ............... 177/136, 146, 233, 232, 177/255, 168, 169, 145

[56] References Cited

U.S. PATENT DOCUMENTS

| 478,699 | 7/1892 | Kousky | 177/233 X |
| 2,970,820 | 2/1961 | Sepich | 177/136 X |
| 3,797,594 | 3/1974 | Chaffee | 177/136 |

Primary Examiner—Joseph W. Hartary
Attorney, Agent, or Firm—Robert D. Yeager; Howard G. Massung

[57] ABSTRACT

A portable scale is provided, to be used in conjunction with the jack tube on a trailer hitch, to provide trailer tongue weight. The tongue weight scale is constructed to accept the trailer tongue support and guide it directly onto a weighing device. The scale is formed with an elongated housing surrounding the jack tube guide and a weighing device. The jack tube guide receives the trailer jack tube and guides it onto the weighing device. The jack tube guide is formed to have an inner dimension just slightly larger than the outer dimension of the jack tube so that during a weighing operation when a load is applied from the jack tube to the weighing device, the jack tube guide sleeve functions to maintain alignment and keep the scale and jack tube together. A scale, disposed on the outside of the elongated housing, operates in conjunction with an indicator connected to the weighing device, to provide a visual indication of the trailer tongue weight.

7 Claims, 4 Drawing Figures

U.S. Patent
Nov. 1, 1977
4,056,155
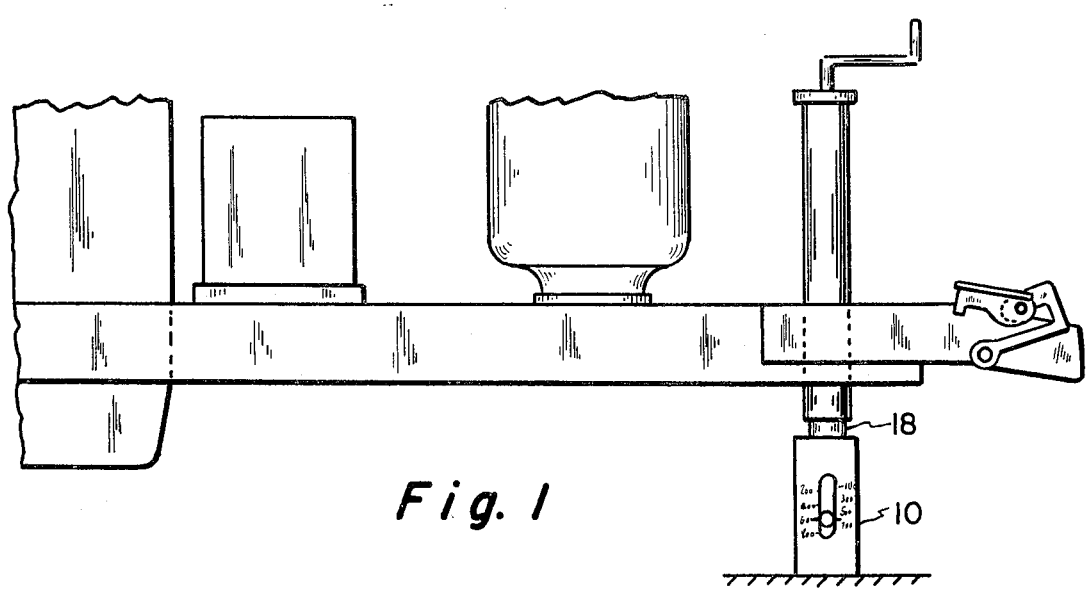
Fig. 1
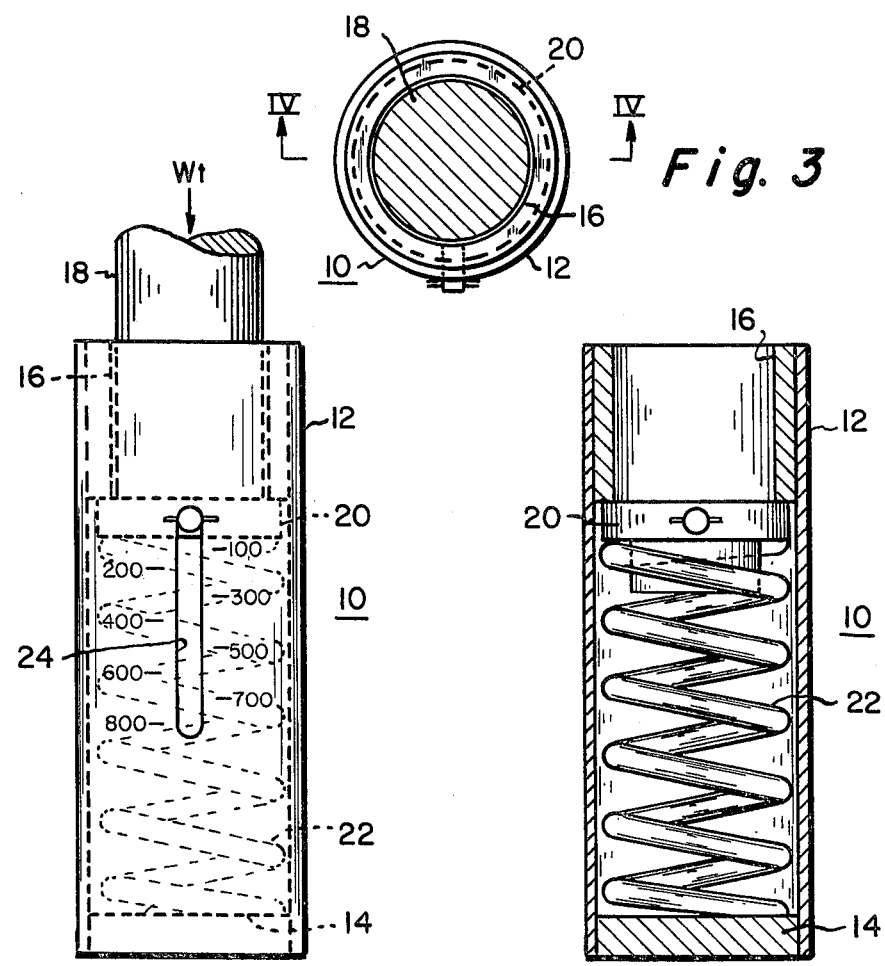
Fig. 3
Fig. 2
Fig. 4

PORTABLE TRAILER TONGUE WEIGHT SCALE

BACKGROUND OF THE INVENTION

1. Field of the Invention

This invention relates generally to scales and more particularly to a portable scale for indicating the dead weight supported by a trailer tongue.

2. Description of the Prior Art

It has been recognized that it is desirable to measure the tongue weight on trailers when loaded. Improper tongue weight can cause problems with the towing vehicle. Too little tongue weight will cause traction problems with the tow vehicle, while too much tongue weight can cause steering problems in the tow vehicle.

A method of determining trailer tongue weight often described in trailer literature utilizes a bathroom scale, a brick and a board. The board is placed so that it is supported on one end by the bathroom scale and on the other end by a brick located at approximately the same height as the bathroom scale. The trailer tongue is located midway between the bathroom scale and the supporting brick. The trailer hitch jack is then positioned on the approximate center of the board to support the trailer. The bathroom scale then indicates approximately one-half of the total tongue weight. That is, the bathroom scale reading is doubled to obtain the tongue weight. If the hitch jack is supported at a position other than the center of the board the scale reading must be multiplied by the ratio of the total board length divided by distance from the brick to the hitch jack to obtain the tongue weight. This is a recommended procedure and trailer manufacturers suggest it be carried out every time the load in the trailer is changed.

Some trailer couplings have been provided with weight indicating devices formed as a permanent part thereof. Exemplary of such trailer hitches or couplings are U.S. Pat. Nos. 3,700,053 and 3,797,594. The type of construction disclosed in these patents requires modification of the basic trailer hitch or coupling in order to accommodate the weighing device. These weighing devices can only be used to provide the tongue weight of the trailer on which they are formed. Existing trailers would require an expensive modification to have such devices formed as a part thereof.

SUMMARY OF THE INVENTION

A portable scale is provided which receives the jack tube of a trailer and provides a direct indication of tongue load of a trailer. The scale has an opening or cavity formed therein which receives the trailer jack tube and guides it directly onto a weighing device. The cavity which is of a dimension only slightly larger than the jack tube secures the jack tube onto the weighing scale device when a load is applied. The disclosed scale is of a simple, rugged, relatively lightweight construction. It is portable and can easily be stored.

The disclosed scale provides for easy measurement of tongue weight on travel trailers. It can be utilized when loading the trailer to obtain the desired tongue weight which is necessary for proper towing. It can also be utilized after the vehicle is towed or moved to assure the load distribution is proper and the tongue weight is within the prescribed limits. The disclosed tongue weight scale consists of a housing having a guide formed therein whose inner diameter is sized to internally accept the jack tube of a trailer. As the trailer jack tube is received into the device, it is contacted by and ultimately rests on a pressure plate. The pressure plate serves to transfer the weight of the trailer jack tube to a weighing device which is subsequently connected to an indicator which indicates trailer hitch weight. The weighing device may be of any standard type such as mechanical, hydraulic, electro-mechanical or the like.

In one embodiment, the weighing device is a compressible spring which is compressed as a load is applied. A recessed opening is formed in the end of the scale for receiving the jack tube of a trailer. The pressure plate is disposed between the spring and the inner end of the recessed opening. The recessed opening can form a sleeve guide for the jack tube. As a load is applied, the spring is compressed. A slotted opening formed in the side of the outer housing can be calibrated to indicate various hitch weights. An indicator, which can either be inside or outside of the housing, is rigidly connected to the pressure plate for relative movement with respect to the calibrated scale as a load is applied. When the trailer is loaded, and the tongue weight is within the desired tolerances the hitch can be made to the towing vehicle, the jack tube retracted, and the portable scale stored.

It is an object of this invention to teach a portable trailer tongue weight scale which engages the jack tube of a trailer for determining trailer tongue weight.

BRIEF DESCRIPTION OF THE DRAWINGS

For a better understanding of the invention, reference may be had to the preferred embodiment of the invention shown in the accompanying drawings in which:

FIG. 1 is a view of a portion of a trailer utilizing a scale constructed according to the teaching of the present invention for determining trailer tongue weight;

FIG. 2 is a front view of a trailer tongue weight scale utilizing the teaching of the present invention;

FIG. 3 is a top view of the scale shown in FIG. 2; and,

FIG. 4 is a section view of the scale shown in FIG. 3 along the lines IV—IV.

DESCRIPTION OF THE PREFERRED EMBODIMENT

Referring now to the drawings, there is shown a portable tongue weight scale 10 utilizing the teaching of the present invention. Scale 10 is formed from a tubular housing 12 which has a closed end 14. A sleeve guide 16 is rigidly connected in the open end of tubular member 12. Elongated tubular cylinder sleeve guide 16 serves to guide jack tube 18 within the scale 10. A pressure plate 20 is disposed within the tongue weight scale below the sleeve guide 16. The weighing device utilized is a compressible spring 22 disposed between closed end 14 and pressure plate 20. As a load is applied to pressure plate 20, spring 22 is controllably compressed. Pressure plate 20 transmits the load on jack tube 18 to the weighing device disposed within scale 10.

Tubular member 12 has a slotted opening 24 formed therein. Calibrated weight indications are provided along the sides of elongated slot 24. An indicator is attached to the pressure plate 20 through slot 24. The indicator could also be formed inside of slot 24 as an integral part of pressure plate 20. Alternately a tubular member could depend from pressure plate 20 and be marked to provide the indicator. As pressure plate 20 moves downward under the weight applied through the trailer jack tube 18, the applied weight is indicated. Spring 22 is selected to provide linear compressability with respect to the weight applied thereto over the selected range.

Guide sleeve 16 is selected to be of a slightly larger inner diameter than the outer diameter of jack tube 18. Guide sleeve 16 is preferably formed from a material, such as polyethylene to allow the jack tube to slide easily therethrough. Sleeve 16 is also selected to be of sufficient length so that when weight is applied through jack tube 18 to pressure plate 20, portable scale 10 is essentially secured to jack tube 18 during the weighing measurement of the trailer tongue load. This provides safety by preventing accidental dislodging of jack tube 18 from scale 10. Sleeve 16 also guides the jack tube directly onto the weighing device.

In the preferred embodiment scale 10 is between 8 and 9 inches long and around 2⅜ inches in diameter. Scale 10 weighs about 4 pounds. The exact weight and dimensions of scale 10 is determined by its weighing capacity and the material used in its construction.

Typically jack tube 18 has a 2 inch outer diameter. The inner diameter of guide sleeve 16 is selected to be slightly larger than 2 inches. Thus a controlled tolerance fit is assured between jack tube 18 and the mating sleeve 16 of scale 10. Sleeve 16 also positions pressure plate 20. Although in the preferred embodiment sleeve 16 and housing tube 12 are formed from separate pieces which are rigidly joined it is to be understood that they could be formed from an integral piece if so desired. Pressure plate 20 abuts the inner end of sleeve 16 under the influence of spring 22.

During a normal weighing operation scale 10 is positioned on a relatively flat spot beneath jack tube 18. Jack tube 18 is then screwed or moved down to engage scale 10. The supporting end of jack tube 18 extends through sleeve 16 engaging and depressing pressure plate 20. The load applied to pressure plate 20 compresses spring 22 allowing pressure plate 20 to be depressed. Any other supports, such as the hitch to a towing vehicle, are removed so that the trailer tongue is supported from jack tube 18 through scale 10. The scale now indicates the tongue weight. The scale disclosed in the preferred embodiment has a relatively large capacity of 800 pounds. The desired tongue support weight is set by the trailer manufacturer and is usually in the range of 10 to 15 percent of the trailer gross weight. A typical desired trailer tongue weight would be 300 ± 45 pound. The trailer tongue weight could be checked after the trailer is loaded, or alternately the scale could be placed in position to indicate tongue weight and as the trailer is loaded the load could be distributed to maintain the desired tongue weight.

The disclosed scale is simple, compact and easy to store. It is portable so that it can be used with a number of trailers, or carried with one trailer on a trip. Direct mating of the jack tube to the scale 10 provides for a safe, stable weighing device. The disclosed scale 10 can be used on existing trailers without modification of the trailer tongue or hitch. The simple, rugged, relatively inexpensive, portable construction makes the disclosed scale 10 usable with a single trailer or to be retained at an area where various trailers traffic to check their weight. That is, this trailer tongue weight scale could easily be maintained at a service station, park station, etc. for checking tongue weight on a loaded trailer as a safety service.

Since numerous changes may be made in the above described apparatus and different embodiments of the invention may be made without departing from the spirit and scope thereof, it is intended that all the matter contained in the foregoing description and shown in the accompanying drawings shall be interpreted as illustrative and not in a limiting sense.

What is claimed is:

1. A portable scale for receiving the jack tube of a trailer tongue to provide trailer tongue load weight comprising:
   a cylindrical tubular housing having a closed end and an open end which receives the jack tube of a trailer tongue;
   a weight sensitive device disposed within said tubular housing and being recessed from the open end of said tubular housing;
   a sleeve secured to the inner diameter of said housing and extending between the open end of said housing and said weight sensitive device;
   a weight scale disposed on the outside circumference of said tubular housing; and,
   indicator means connected to said weight sensitive device for movement relative to said weight scale whereby the applied load weight is indicated.

2. An apparatus as claimed in claim 1 wherein said weight sensitive device comprises:
   a compressible spring disposed within said tubular housing;
   a retainer plate having a diameter greater than said compressible spring and being engaged by said compressible spring; and,
   means for restricting the movement of said retainer plate toward the open end of said tubular member while permitting movement under load towards the closed end of said tubular member.

3. Apparatus as claimed in claim 2 wherein said means for restricting movement of said retainer plate comprises:
   said sleeve which is constructed from a non-metallic low friction material having with the same shape as said jack tube and being of sufficient length to guide the jack tube onto said retainer plate and to restrict movement when a load is applied thereto.

4. Apparatus as claimed in claim 3 comprising:
   a longitudinal slot formed in the side of said tubular member;
   an indicator connected to said retainer plate through said longitudinal slot; and,
   weight indicating means formed along said tubular member at the outside of said slot in proximity to the outer diameter of said housing.

5. A trailer tongue weight scale which receives the trailer tongue jack support tube comprising:
   weight responsive means for predetermined deflection when weight is applied thereto;
   an elongated sleeve disposed above said weight responsive means having an inner diameter slightly greater than the outer diameter of the jack tube and being disposed to guide the jack tube onto said weight responsive means;
   a circular housing disposed around said weight responsive means and said elongated sleeve; and,
   weight indicating means, formed in proximity to the outside of said housing, disposed to be visible on the outside of said housing and being connected to said weight responsive means for indicating trailer tongue weight.

6. A trailer tongue weight scale as claimed in claim 5 wherein said weight responsive means comprises: pg,16
   a movable pressure plate; and, a compressable spring disposed between the bottom of said housing and said movable pressure plate supporting said movable pressure plate in engagement with the bottom of said elongated sleeve.

7. A trailer tongue weight scale as claimed in claim 6 wherein said housing is tubular shaped with one open end and a bottom closed end;
 a calibrated slot formed through the wall of said tubular housing; and,
 an indicator extending through said slot and connected to said movable pressure plate.

* * * * *

UNITED STATES PATENT AND TRADEMARK OFFICE
CERTIFICATE OF CORRECTION

PATENT NO. : 4,056,155
DATED : November 1, 1977
INVENTOR(S) : Martin H. Wahl

It is certified that error appears in the above-identified patent and that said Letters Patent are hereby corrected as shown below:

Claim 6, line 2, after "comprises:" "pg, 16" should be deleted.

Signed and Sealed this

Seventh Day of February 1978

[SEAL]

Attest:

RUTH C. MASON
*Attesting Officer*

LUTRELLE F. PARKER
*Acting Commissioner of Patents and Trademarks*